(12) United States Patent
Shimbo et al.

(10) Patent No.: US 6,533,939 B2
(45) Date of Patent: Mar. 18, 2003

(54) PACKING AGENT FOR REVERSED PHASE LIQUID CHROMATOGRAPHY AND PRODUCTION PROCESS THEREOF

(75) Inventors: Kuniaki Shimbo, Kanagawa (JP); Keisuke Mano, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 98 days.

(21) Appl. No.: 09/801,692

(22) Filed: Mar. 9, 2001

(65) Prior Publication Data

US 2001/0031701 A1 Oct. 18, 2001

Related U.S. Application Data

(60) Provisional application No. 60/215,772, filed on Jun. 30, 2000, and provisional application No. 60/230,801, filed on Sep. 7, 2000.

(30) Foreign Application Priority Data

| Mar. 9, 2000 | (JP) | ........................................ 2000-064714 |
| Aug. 29, 2000 | (JP) | ........................................ 2000-258411 |

(51) Int. Cl.$^7$ .............................................. B01D 15/08
(52) U.S. Cl. .................... 210/656; 210/656; 210/198.2; 210/502.1; 502/402; 502/439
(58) Field of Search .............................. 210/635, 656, 210/658, 198.2, 198.3, 502.1; 502/401, 402, 439

(56) References Cited

U.S. PATENT DOCUMENTS

| 4,118,347 A | * | 10/1978 | Ishiguro | .................. 210/198.2 |
| 4,468,330 A | | 8/1984 | Kamiyama et al. | .......... 210/656 |
| 4,948,816 A | * | 8/1990 | Hirayama | ..................... 521/56 |
| 5,196,527 A | * | 3/1993 | Ookuma | ....................... 536/56 |
| 5,821,193 A | * | 10/1998 | Tani | ............................ 210/656 |
| 6,475,478 B2 | * | 11/2002 | Hirai | ........................... 210/634 |

FOREIGN PATENT DOCUMENTS

| DE | 27 28 146 | | 12/1977 | .............. 210/198.2 |
| GB | 2 184 732 A | | 7/1987 | .............. 210/198.2 |
| JP | 4-58154 | * | 2/1992 | .................. 210/635 |

OTHER PUBLICATIONS

PTO Translation of Japan Patent No. 4–58154 PTO 02–4254 Aug. 2002 pp. 1–13.*
Patent Abstracts of Japan, vol. 016, No. 251 (P–1366), Jun. 8, 1992 (1992–06–08) A (Hitachi Chem Co Ltd), Feb. 25, 1992 (1992–02–25) Abstract of JP 04–05814.

* cited by examiner

Primary Examiner—Ernest G. Therkorn
(74) Attorney, Agent, or Firm—Sughrue Mion, PLLC

(57) ABSTRACT

The present invention relates to a packing agent for reversed phase liquid chromatography, including crosslinked polymer base particles which are obtained by aqueous suspension-polymerization of a crosslinkable vinyl ester or vinyl ether having a hydroxyl group within the molecule and which has an exclusion limit molecular weight of 100,000 or less in terms of standard polystyrene by size exclusion chromatography, wherein an acyl group having from 4 to 24 carbon atoms is ester-bonded to a part of hydroxyl groups in the crosslinked polymer base particles. The present invention also provides a production process of a packing agent, a column for reversed phase liquid chromatography using the packing agent, and an analysis method by reversed phase liquid chromatography using the packing agent.

7 Claims, No Drawings

PACKING AGENT FOR REVERSED PHASE LIQUID CHROMATOGRAPHY AND PRODUCTION PROCESS THEREOF

CROSS REFERENCE TO RELATED APPLICATIONS

This application is an application filed under 35 U.S.C. §111(a) claiming benefit pursuant to 35 U.S.C. §119(e) (1) of the filing dates of Provisional Application No. 60/215,772 filed Jun. 30, 2000 and Provisional Application No. 60/230,801 filed Sep. 7, 2000 pursuant to 35 U.S.C. §111(b).

FIELD OF THE INVENTION

The present invention relates to a packing agent for reversed phase liquid chromatography, a production process of the packing agent, a column for reversed phase liquid chromatography using the packing agent, and an analysis method by reversed phase liquid chromatography using the packing agent.

BACKGROUND OF THE INVENTION

The separation system of liquid chromatography includes gel permeation, partition adsorption, ion exchange, ion pair, ligand exchange and affinity. An optimal system is selected according to the properties of the substance to be separated. Among these, the partition adsorption is most widely used and this includes a normal phase mode and a reversed phase mode. In the normal phase mode, the separation occurs due to the hydrophilic interaction between the packing agent and the substance to be separated, and in the reversed phase mode, the separation takes place due to the hydrophobic interaction between the packing agent and the substance to be separated. In actual practice, however, the reversed phase mode is preferred because the mobile phase can be selected from a wide range and good resolution can be easily obtained. In many cases, the partition adsorption may be considered to indicate the reversed phase mode. The column used for the separation in this reversed phase mode is a column for reversed phase liquid chromatography and the separating agent filled thereinto is a packing agent for reversed phase liquid chromatography.

The column for reversed phase liquid chromatography includes silica type and polymer type columns. Most commercially available products are silica type and among these, a column called ODS column obtained by chemically bonding an octadecyl group to the surface of silica gel is overwhelmingly predominant, and is being used in various industrial and academic fields over a wide range. However, the silica-type packing agent used in the ODS column is found to have problems in that the acid resistance/alkali resistance is not sufficiently high and a basic substance readily adsorbs thereto. In recent years, investigations have been made on various techniques to overcome this problem. One of these methods is to use a polymer-type packing agent in place of the silica-type packing agent. Since the above-described problem is greatly attributable to the base material silica gel, the exchange of the base material itself is expected as a most essential countermeasure.

Examples of the polymer-type column for reversed phase liquid chromatography heretofore available on the market or reported include the following:

(1) styrene-divinylbenzene type crosslinked polymer particle (e.g., Shodex (trademark of Showa Denko K.K.) RSpak RP18-413 produced by Showa Denko K.K.);

(2) methacrylate-type crosslinked polymer particle (e.g., Shodex (trademark of Showa Denko K.K.) RSpak DE-413 produced by Showa Denko K.K.);

(3) poly(vinyl alcohol)-type crosslinked polymer particle having chemically bonded thereto a long-chain acyl group (e.g., Shodex (trademark of Showa Denko K.K.) Asahipak ODP-50 4D produced by Showa Denko K.K.); and (4) hydroxyl group-containing methacrylate-type crosslinked polymer particle having chemically bonded thereto a long chain acyl group (see, JP-A-4-58154 (the term "JP-A" as used herein means an "unexamined published Japanese patent application")).

These polymer-type columns for reversed phase liquid chromatography are generally excellent in the acid resistance/alkali resistance, and therefore, one of the problems of the ODS column is solved. However, another problem that a basic substance readily adsorbs still remains unsolved. In addition, the polycyclic aromatic compound is liable to have a broad peak.

The polycyclic aromatic group of the polycyclic aromatic compound is very popular as a partial structure of naturally occurring products or medicaments and it is disadvantageous if the polycyclic aromatic group cannot be sharply separated. Unless separation performance equal to or higher than that of the ODS column can be obtained for many compounds, the polymer-type column for reversed phase liquid chromatography cannot have a truly elevated value in practical use despite its excellent acid resistance/alkali resistance. Therefore, it is necessary for separation performance to be equal to or higher than that of the ODS column.

In conventional polymer-type columns for reversed phase liquid chromatography, polycyclic aromatic compounds are considered to give a broad peak because of the following reasons. The particle has an internal structure such that flat and slit-like hydrophobic micropores are readily formed and a polycyclic aromatic compound easily fits into the pore present. Furthermore, the hydrophobicity is almost the same between the outside and the inside of the particle. Therefore, a great difference is generated in the migration speed between the molecule that permeated into the inside and is "fitted" and the molecule "slipped" on the outside. This is individually verified below for the above-described four conventional techniques (1) to (4).

In the styrene-divinylbenzene type crosslinked polymer particle of (1), the skeleton itself of the packing agent is an aromatic ring. Therefore, the interaction between the hydrophobic micropore and the polycyclic aromatic compound is highest and the peak is very largely broadened.

In the methacrylate-type crosslinked polymer particle of (2), the skeleton does not contain an aromatic ring; however, an interaction is still present between the hydrophobic micropore surrounded by a carbonyl group and the polycyclic aromatic compound. Therefore, the peak is also broadened.

In the poly(vinyl alcohol)-type crosslinked polymer particle having chemically bonded thereto a long chain acyl group of (3), a non-saponified acetyl group remains in some hydrophobic micropores, and therefore, the peak is also broadened.

In the hydroxyl group-containing methacrylate-type crosslinked polymer particle having chemically bonded thereto a long-chain acyl group of (4), the inside is uniformly hydrophilized by the unreacted hydroxyl group. Therefore, even if the polycyclic aromatic compound migrates into the inside, the residence time is probably short because of low interaction. As a result, the hydrophobic interaction is limited to occur only between the polycyclic aromatic compound and the long-chain acyl group on the surface, and the peak is inhibited from broadening.

However, when the method of (4) was actually performed by varying the conditions in several ways, it was difficult to form a sharp peak for the polycyclic aromatic compound. From this result, the present inventors thought that another important factor must be present which was not taken into account in conventional techniques.

The object of the present invention is to elucidate the factor for inhibiting the aromatic compound from forming a sharp peak and provide specific means capable of actually forming a sharp peak for polycyclic aromatic compounds.

As described above, JP-A-4-58154 describes a crosslinked copolymer particle obtained by chemically bonding a long-chain acyl group to a hydroxyl group-containing methacrylate-type crosslinked polymer particle, which is excellent in the acid resistance and the alkali resistance and exhibits very small difference in the swelling/shrinkage among various solvents. However, this crosslinked polymer particle is not disclosed as forming a sharp peak for polycyclic aromatic compounds, and in the tests performed by the present inventors, such a phenomenon was not verified.

As a result of extensive investigations to overcome the above-described problems, the present inventors concluded that the pore size of the base particle is generally too large and this is one of the factors causing the problems. More specifically, if in the base particle used, pores have a sufficiently large size for the bulk of the long-chain acyl group-introducing reagent to occupy almost all of the pores, the long-chain acyl group is introduced into the inside (deeply) of the particle. As a result, the object that only the vicinity of the particle surface is hydrophobitized is defeated.

This may be prevented by using a base particle in which a large proportion is occupied by pores having a relatively small size and not easily allowing invasion of the long-chain acyl group-introducing reagent. Based on this estimation, extensive investigations have been made for further reducing the pore size of the base particle. As a result, it has been found that when a base particle having an exclusion limit molecular weight of 100,000 or less in terms of the standard polystyrene is used, the hydrophobitization ratio increases only in the vicinity of the surface and in turn the polycyclic aromatic compound forms a sharp peak, whereby the above-described problem is solved.

SUMMARY OF THE INVENTION

The present invention relates to a packing agent for reversed phase liquid chromatography, a production process thereof, a column for reversed phase liquid chromatography using the packing agent, and an analysis method by reversed phase liquid chromatography using the packing agent.

More specifically, the present invention relates to the following matters.

(1) A packing agent for reversed phase liquid chromatography, comprising crosslinked polymer base particles obtained by aqueous suspension-polymerization of a crosslinkable vinyl ester or vinyl ether containing a hydroxyl group within the molecule, and having an exclusion limit molecular weight of 100,000 or less in terms of standard polystyrene by size exclusion chromatography, wherein an acyl group having from 4 to 24 carbon atoms is ester-bonded to a part of hydroxyl groups in the crosslinked polymer base particles.

(2) The packing agent for reversed phase liquid chromatography as described in (1), wherein the acyl group is introduced in an amount of from 1 to 30 mol % based on all hydroxyl groups in the crosslinked polymer base particles.

(3) The packing agent for reversed phase liquid chromatography as described in (1) or (2) above, wherein the acyl group is one or more groups selected from the group consisting of a tetracosanoyl group, a docosanoyl group, an eicosanoyl group, an octadecanoyl group, a hexadecanoyl group, a tetradecanoyl group, a dodecanoyl group, a decanoyl group, an octanoyl group, a 2-ethylhexanoyl group, a hexanoyl group and a butanoyl group.

(4) The packing agent for reversed phase liquid chromatography as described in any one of (1) to (3) above, wherein a free carboxyl group in the crosslinked polymer base particles is capped with an inactive group.

(5) The packing agent for reversed phase liquid chromatography as described in any one of (1) to (4) above, wherein the crosslinked polymer base particles have an average particle size of from 1 to 200 $\mu$m.

(6) A process for producing a packing agent for reversed liquid chromatography, comprising polymerizing in an aqueous suspension a crosslinkable vinyl ester or vinyl ether containing a hydroxyl group within the molecule, classifying the obtained crosslinked polymer particles into crosslinked polymer base particles having an exclusion limit molecular weight of 100,000 or less in terms of standard polystyrene by size exclusion chromatography, and ester-bonding an acyl group having from 4 to 24 carbon atoms to a part of hydroxyl groups in the crosslinked polymer base particles.

(7) The production process of a packing agent for reversed phase liquid chromatography as described in (6) above, wherein at least one hydrophilic solvent selected from the group consisting of alcohols having from 5 to 12 carbon atoms is used as a diluent for aqueous suspension polymerization.

(8) The production process of a packing agent for reversed phase liquid chromatography as described in (7) above, wherein the diluent is added in an amount of 10 to 300% by mass based on a total amount of monomers.

(9) The production process of a packing agent for reversed phase liquid chromatography as described in any one of (6) to (8) above, wherein the acyl group is introduced in an amount of 1 to 30 mol % based on all hydroxyl groups in the crosslinked polymer base particles.

(10) The production process of a packing agent for reversed phase liquid chromatography as described in any one of (6) to (9) above, wherein the acyl group introduced is a group selected from the group consisting of a tetracosanoyl group, a docosanoyl group, an eicosanoyl group, an octadecanoyl group, a hexadecanoyl group, a tetradecanoyl group, a dodecanoyl group, a decanoyl group, an octanoyl group, a 2-ethylhexanoyl group, a hexanoyl group and a butanoyl group.

(11) The production process of a packing agent for reversed phase liquid chromatography as described in any one of (6) to (10) above, wherein a free carboxyl group in the crosslinked polymer base particles is capped by an inactive group.

(12) The production process of a packing agent for reversed phase liquid chromatography as described in any one of (6) to (11) above, wherein the crosslinked polymer base particles is washed with a polar organic solvent and dried immediately before the reaction of introducing an acyl group.

(13) A column for reversed phase liquid chromatography, wherein the packing agent for reversed phase liquid chromatography described in any one of (1) to (5) above is filled.

(14) A method for analyzing a sample containing a polycyclic aromatic compound by reversed phase liquid chromatography, which uses the column for reversed phase liquid chromatography described in (13) above.

(15) The method for analyzing a sample containing a polycyclic aromatic compound by reversed phase liquid chromatography as described in (14) above, wherein peaks of benzene, naphthalene, anthracene and pyrene each deviates from a base line and a ratio of a theoretical plate number of pyrene to a theoretical plate number of benzene is 0.7 or more.

DESCRIPTION OF THE PREFERRED EMBODIMENTS

Examples of the crosslinkable vinyl ester or crosslinkable vinyl ether having a hydroxyl group within the molecule for use in the present invention include glycerol diacrylate, glycerol dimethacrylate, trimethylolpropane diacrylate, trimethylolpropane dimethacrylate, di- or tri-acrylate of tetramethylolmethane, di- or tri-methacrylate of tetramethylolmethane, glycerol diallylether, trimethylolpropane diallylether and di- or tri-allylether of tetramethylolmethane. Among these, from the standpoint of uniformly and densely performing the crosslinking and increasing the hydroxyl group content as high as possible, glycerol dimethacrylate and glycerol diacrylate are preferred. Those compounds can be used individually or in combination of two or more thereof. Furthermore, as long as the object of the present invention is not inhibited, another vinyl compound may be used in combination, if desired.

In the present invention, the crosslinkable vinyl ester having a hydroxyl group within the molecule or the crosslinkable vinyl ether having a hydroxyl group within the molecule and another vinyl compound which is added, if desired (hereinafter these are referred to as "monomers"), are polymerized in aqueous suspension using as the diluent an organic solvent incapable of freely mixing with water but being relatively hydrophilic, to form crosslinked polymer particles.

The diluent for use in the present invention is not particularly limited as long as it satisfies the condition that the crosslinked polymer particle produced has an exclusion limit molecular weight of 100,000 or less in terms of the standard polystyrene by the size exclusion chromatography method.

However, since a monomer having a hydroxyl group is mainly used, use of a diluent having higher affinity for the monomer causes further reduction in the exclusion limit molecular weight, and in this respect, a diluent mainly comprising an alcohol having from 5 to 12 carbon atoms such as isoamylalcohol, 1-hexanol, cyclohexanol, 1-octanol, 2-ethylhexanol, 1-decanol and 1-dodecanol, is preferably used. Such diluents may be used individually or in combination of two or more thereof.

The amount of the diluent added is from 10 to 300% by mass, preferably from 20 to 200% by mass, more preferably from 25 to 100% by mass, based on the total amount of monomers. If the amount added is less than 10% by mass, the surface area of the crosslinked polymer particle is excessively reduced and this is not preferred, whereas if it exceeds 300% by mass, the crosslinked polymer particle is disadvantageously deficient in the physical strength.

In the present invention, the polymerization reaction is performed in the presence of a polymerization initiator. Examples of the polymerization initiator include commonly used polymerization initiators such as azo-type compounds (e.g., 2,2'-azobis(isobutyronitrile), 2,2'-azobis(2,4-dimethylvaleronitrile)) and organic peroxides (e.g., benzoyl peroxide, dicumyl peroxide, di-t-butyl peroxide, t-butyl perbenzoate, methyl ethyl ketone peroxide). These are used individually or in combination of two or more thereof.

The concentration of the polymerization initiator is appropriately determined according to the kind of the monomers and the like and cannot be indiscriminately specified; however, the concentration of the polymerization initiator is preferably from 0.1 to 5% by mass based on the total amount of monomers.

In the present invention, a dispersion stabilizer is added to the aqueous phase at the aqueous suspension polymerization. Examples of the dispersion stabilizer which can be used include water-soluble polymer compounds such as poly (vinyl alcohol), alkyl cellulose, hydroxyalkyl cellulose, carboxyalkyl cellulose, sodium polyacrylate and gelatin. The concentration of the dispersion stabilizer is not particularly limited but it is preferably from 0.1 to 5% by mass based on the water.

In the present invention, a salt is preferably added to the aqueous phase at the aqueous suspension polymerization so as to prevent the monomer having a hydroxyl group within the molecule or the alcohol-type diluent from dissolving in the aqueous phase. Examples of the salts which can be added include sodium chloride, calcium chloride and sodium sulfate. These salts may be used individually or in combination of two or more thereof. The concentration of the salt used is not particularly limited but, for example, sodium chloride may be used in the range from 0.5 to 15% by mass based on the water.

In the present invention, if the proportion of the aqueous phase to the oil phase is excessively large at the aqueous suspension polymerization, the amount of the monomer having a hydroxyl group within the molecule or the alcohol-type diluent which are dissolved in the aqueous phase increases, whereas if it is too small, oil droplets are liable to associate. Accordingly, the mass of water used is preferably from 200 to 1,000% by mass based on the total amount of the monomers and the diluent.

Before starting the aqueous suspension polymerization, the oil phase and the aqueous phase are mixed and dispersed so that the oil droplets can have an objective particle size. For the dispersion, a stirring apparatus equipped with a stirring blade for the formation of fine particles, a high-speed disperser (homogenizer) or the like may be used.

In the case of forming a packing agent having a relatively large particle size, a stirring apparatus equipped with a stirring blade for the formation of fine particles is preferably used and in the case of forming a packing agent having a relatively small particle size, a high-speed disperser (homogenizer) is preferably used.

The conditions for the polymerization reaction are not particularly limited thereto and ordinary conditions may be applied. For example, the polymerization reaction is performed under stirring at a temperature of 40 to 100° C. for 3 to 24 hours, preferably at a temperature of 50 to 80° C. for 5 to 12 hours.

The thus-obtained crosslinked polymer particles are porous particles having an average particle size of 0.1 to 200 μm. As the base particle of a packing agent for reversed phase chromatography, the average particle size is preferably on the order of 1 to 100 μm, more preferably from 1 to 10 μm.

In the present invention, an acyl group having from 4 to 24 carbon atoms is ester-bonded to a part of hydroxyl groups in the crosslinked polymer particle having an exclusion limit molecular weight of 100,000 or less obtained above. If the acyl group has 3 or less carbon atoms, the separation precision is deteriorated, whereas if the acyl group has 25 or more carbon atoms, the synthesis is difficult to perform and this is disadvantageous in the practical use.

Examples of the acyl group having from 4 to 24 carbon atoms, which is ester-bonded to a part of hydroxyl groups in the crosslinked polymer particle of the present invention, include a tetracosanoyl group, a docosanoyl group, an eicosanoyl group, an octadecanoyl group, a hexadecanoyl group, a tetradecanoyl group, a dodecanoyl group, a decanoyl group, an octanoyl group, a 2-ethylhexanoyl group, a hexanoyl group and a butanoyl group.

The reagent used for introducing the acyl group may be an acid chloride, an acid anhydride, a dehydration condensing agent with carboxylic acid, or a carboxylic acid active ester.

Specific examples thereof include a tetracosanoic acid, a docosanoic acid, an eicosanoic acid, a stearic acid, a palmitic acid, a myristic acid, a lauric acid, a decanoic acid, an octanoic acid, 2-ethylhexanoic acid, hexanoic acid, a butanoic acid, and acid chlorides, acid anhydrides and active esters thereof. Among these, in view of the reactivity and profitability, carboxylic acid chloride and carboxylic acid anhydride are preferred.

This reagent is used, if desired, together with a catalyst in an organic solvent which does not reacts with the reagent itself. Examples of the organic solvent which does not react with the reagent itself include toluene, xylene, pyridine and tetrahydrofuran. Examples of the catalyst which can be used include pyridine, picoline and 4-(dimethylamino)pyridine. Among these, because it can function also as a base or a solvent, or in view of profitability, pyridine is preferred.

In the present invention, the introduction ratio of the acyl group is suitably from 1 to 30 mol %, preferably from 1 to 15 mol %, more preferably from 2 to 10 mol %, based on all hydroxyl groups in the base polymer. If the introduction ratio of the acyl group is less than 1 mol %, the separation efficiency decreases, whereas if it exceeds 30 mol %, the concept of hydrophobitizing only the particle surface is defeated and the peak of polycyclic aromatic compound is disadvantageously broadened.

In practice, as long as the exclusion limit molecular weight of the base particle is 100,000 or less, the hydroxyl group inside the particle hardly causes a reaction even if excess reagent is used. Therefore, the introduction ratio of the acyl group scarcely exceeds 30 mol %.

However, for practical use, a method of using a reagent for introducing the acyl group in an amount of less than 100 mol % based on all hydroxyl groups in the base particle and hydrophobitizing only the vicinity of the particle surface in a necessary amount within a short time period, is preferably used.

For example, in the case where the base polymer is a glycerol dimethacrylate homopolymer having an exclusion limit molecular weight of 100,000 or less and an octadecanoyl group is introduced thereinto, a stearic acid chloride is used in an amount of 10 to 50 mol % based on all hydroxyl groups in the base particle together with a necessary amount of a base, whereby the packing agent obtained can form a very sharp peak for polycyclic aromatic compounds and can have sufficiently high holding property.

The packing agent in which an acyl group is introduced as above may be used as it is in the column for reversed phase chromatography. However, when a free carboxyl group, which is considered to be produced in a slight amount during polymerization, is capped with an inactive group, a more excellent column prevented from the adsorption of basic substances can be provided.

The free carboxylic acid can be capped by utilizing an esterification or amidation reaction. Specifically, a method of methyl-esterifying the free carboxyl group using 2,2-dimethoxypropane and a catalytic amount of concentrated hydrochloric acid, is preferably used because it is simple, convenient and profitable.

In the present invention, by performing an operation of washing base particles with a polar organic solvent to thoroughly remove hydroxyl group-containing impurities (for example, poly(vinyl alcohol) used in the dispersion stabilizer) and drying them by heating under reduced pressure immediately before the reaction of introducing an acyl group to thoroughly remove the residual water content, not only the minimum desired amount of the reagent introduced can be reduced to an extreme, but also the produced column for reversed phase chromatography can be more elevated in aging stability. These results are attained because a disadvantageous phenomenon is prevented from occurring, such that hydroxyl group-containing impurities not covalently bonded to the packing agent are simultaneously acylated and gradually fall off on use of the column. Examples of polar organic solvents used for washing include dimethylsulfoxide, N,N-dimethylformamide, N,N-dimethyl-acetamide and N-methylpyrrolidone. With respect to the washing method, a method where the basic particles are dipped in a polar organic solvent for a fixed time, filtered, again washed on a funnel and then thoroughly purged with water is preferably used. In order to elevate the dissolving rate and the solubility of hydroxyl group-containing impurities, the base particles are preferably applied with an ultrasonic wave treatment immediately after the dipping or heated with stirring during the dipping.

The column for reversed phase liquid chromatography of the present invention can be manufactured by filling the packing agent of the present invention into an empty column made of stainless steel or plastic by dry filling or wet filling (slurry method).

The thus-obtained column for reversed phase liquid chromatography of the present invention is characterized by having separation performance equal to or higher than the ODS column using a silica-type packing agent, particularly characterized in that the peak of polycyclic aromatic compounds is not broadened. Moreover, this column for reversed phase liquid chromatography is completely free of problems often encountered in ODS column, such as adsorption of basic substances and insufficient resistance against acid or alkali, and exhibits very excellent capability.

EXAMPLES

The present invention is described in greater detail below by referring to the Examples, however, the present invention is by no means limited to these Examples. Unless indicated otherwise herein, all parts, percents, ratios and the like are by weight.

Example 1

Step 1: Synthesis of Base Material Gel

To a mixed solution containing 2,000 g of glycerol dimethacrylate and 1,000 g of 1-hexanol, 30 g of 2,2'-azobis (isobutyronitrile) was dissolved to prepare an oil phase. Separately, 120 g of poly(vinyl alcohol) (Kuraray Poval PVA-224, produced by Kuraray K.K.) was dissolved in 3 l of water and thereto, 7 l of water and subsequently an aqueous solution (2 l) containing 240 g of sodium chloride were added and mixed to prepare an aqueous phase. The thus-obtained oil phase and aqueous phase were mixed in a 20 l-volume stainless steel-made container and the mixture was placed in a high-speed disperser (homogenizer) and dispersed while controlling the revolution number and the dispersion time to obtain oil droplets having a maximum particle size of 5 μm.

Thereafter, the dispersion was reacted at 60° C. for 7 hours while stirring at 150 rpm. The resulting crosslinked polymer particles were centrifuged (at 2,000 rpm for 10 minutes), the supernatant was removed, and the precipitate was dispersed in 12 l of hot water at 70° C. (using an ultrasonic washer) and then stirred at 70° C. for 3 hours. The resulting dispersion was filtered by suction and the cake on the funnel was washed with 60 f of hot water at 70° C. and subsequently with 18 l of acetone, air-dried by spreading the particles in a stainless steel-made vat and further dried under reduced pressure at 60° C. for 24 hours. These particles were classified by a pneumatic classifier to obtain 320 g of crosslinked polymer particles having an average particle size of 4 μm (hereinafter referred to as a "base material gel").

Step 2: Thorough Washing

To 50 g of the base material gel obtained in the above step 1, 500 ml of dimethylsulfoxide was added. The resulting mixture was stirred under heating at 60° C. for 5 hours and then the particles were collected by filtration, washed in sequence with 500 ml of dimethylsulfoxide, with 2 l of hot water at 70° C. and with 300 ml of methanol, air-dried by spreading the particles in a stainless steel-made vat and further dried under reduced pressure at 70° C. for 24 hours to obtain 48 g of a thoroughly washed base material gel.

Measurement of Exclusion Limit Molecular Weight

The thoroughly washed base material gel obtained in the above step 2 was filled into a stainless steel-made column of 4.6 mm (inside diameter)×150 mm (length) by a slurry method and after the displacement with THF, a series of standard polystyrenes were analyzed by GPC. The results were plotted and from the calibration curve obtained, the exclusion limit molecular weight was determined and found to be about 40,000.

Step 3: Modification Reaction

In 110 ml of toluene, 20 g of the thoroughly washed base material gel obtained in the step 2 was dispersed. After adding 3.9 g of pyridine thereto, the mixture was subjected to an ultrasonic wave treatment for 3 minutes, and 6.0 g of stearoyl chloride was added dropwise thereto over 15 minutes while stirring and reacted at 60° C. for 5 hours. Insoluble matters were collected by filtration and washed in sequence with THF (250 ml), with denatured alcohol (250 ml), with denatured alcohol/water at 1/1 (250 ml), with THF (250 ml) and then with methanol (250 ml) to obtain 35.57 g of a modified gel wetted with methanol.

Step 4: Capping Treatment

In 100 ml of 2,2-dimethoxypropane, 35.57 g of the modified gel wetted with methanol obtained in the above step 3 was dispersed. After adding thereto 2.0 ml of concentrated hydrochloric acid, the resulting dispersion was subjected to an ultrasonic wave treatment for 3 minutes and then stirred at 50° C. for 2 hours. Insoluble matters were collected by filtration and washed in sequence with methanol (250 ml), with methanol/water at 1/1 (250 ml) and with methanol (250 ml). Then, the particles were air-dried and further dried under reduced pressure at 60° C. for 24 hours to obtain 21.03 g of a capping-treated modified gel.

Introduction Ratio of Octadecanoyl Group

From respective elemental analysis values of the base material gel and the modified gel, the introduction ratio of octadecanoyl group based on all hydroxyl groups in the base material gel was calculated and found to be 3.5 mol %.

Measurement of Capability

The capping-treated modified gel obtained in the above step 4 was filled into a stainless steel-made column of 4.6 mm (inside diameter)×150 mm (length) by a slurry method to manufacture a column for reversed phase liquid chromatography. Using this column, the theoretical plate number was measured for the peaks of benzene and polycyclic aromatic compounds under the following measuring conditions for reversed phase liquid chromatography.

| Measuring Conditions for Reversed Phase Liquid Chromatography: | |
|---|---|
| Eluent: | $CH_3CN$/water = 65/35 (v/v) |
| Flow rate: | 1.00 ml/min |
| Column temperature: | 40° C. |
| Detector: | UV 254 nm |
| Samples: | benzene (5 μl/ml) |
| | naphthalene (0.4 mg/ml) |
| | anthracene (0.005 mg/ml) |
| | pyrene (0.3 mg/ml) |
| Injection volume: | 5 μl |

As a result, the following values were obtained as the theoretical plate number for each peak. In the parentheses, a ratio to the value of benzene taken as 1 is shown. Benzene: 15,100 (1.00), naphthalene: 13,300 (0.88), anthracene: 13,800 (0.91) and pyrene: 12,100 (0.80).

Comparative Example 1

Step 1: Synthesis of Base Material Gel

The polymerization, washing, drying and classification were performed in the same manner as in Example 1 except for using cellosolve acetate in place of 1-hexanol, as a result, 340 g of crosslinked polymer particles having an average particle size of 4 μm was obtained (hereinafter referred to as a "base material gel").

Step 2: Thorough Washing

In the same manner as in Example 1, 48 g of a thoroughly washed base material gel was obtained.

Measurement of Exclusion Limit Molecular Weight

The exclusion limit molecular weight was determined in the same manner as in Example 1 and found to be about 700,000.

Step 3: Modification Reaction

In the same manner as in Example 1, 36.87 g of a modified gel wetted with methanol was obtained.

Step 4: Capping Treatment

In the same manner as in Example 1, 22.54 g of a capping-treated modified gel was obtained.

Introduction Ratio of Octadecanoyl Group

From respective elemental analysis values of the base material gel and the modified gel, the introduction ratio of octadecanoyl group based on all hydroxyl groups in the base material gel was calculated and found to be 4.1 mol %.

Measurement of Capability

In the same manner as in Example 1, the theoretical plate number was measured for the peaks of benzene and polycyclic aromatic compounds.

As a result, the following values were obtained as the theoretical plate number for each peak. In the parentheses, a ratio to the value of benzene taken as 1 is shown. Benzene: 12,000 (1.00), naphthalene: 10,500 (0.88), anthracene: 6,040 (0.50) and pyrene: 3,980 (0.33).

Comparative Example 2

In 15 ml of toluene, 4.0 g of the capping-treated modified gel obtained in Example 1 was dispersed, and thereto a mixture of 24 mg of 4-(dimethylamino)pyridine, 3.1 g of pyridine and 2.0 g of acetic acid anhydride was added. The container was tightly closed and the dispersion was subjected to an ultrasonic wave treatment for 20 minutes and then left standing at room temperature overnight. The gel obtained was collected by filtration, washed in sequence with THF, with denatured alcohol, with water, with acetone and with methanol each in 50 ml, then air-dried and further dried under reduced pressure at 60° C. for 24 hours.

The thus-obtained modified gel, in which the remaining hydroxyl groups were acetylated, was filled into a stainless steel-made column of 4.6 mm (inside diameter)×150 mm (length) by a slurry method to manufacture a column for reversed phase liquid chromatography. Using this column, the theoretical plate number was measured for the peaks of benzene and polycyclic aromatic compounds under the same measurement conditions as described in Example 1.

As a result, the following values were obtained as the theoretical plate number for each peak. In the parentheses, a ratio to the value of benzene taken as 1 is shown. Benzene: 13,100 (1.00), naphthalene: 11,100 (0.85), anthracene: 8,780 (0.67) and pyrene: 7,200 (0.55).

Comparative Example 3

Using commercially available polymer-type Reversed Phase Column-A (using a packing agent having an average particle size of 5 μm in which an octadecanoyl group is introduced into a poly(vinyl alcohol) particle crosslinked with triallyl isocyanurate; 4.6 mm (inside diameter)×150 mm (length)), the theoretical plate number was measured for peaks of benzene and polycyclic aromatic compounds under the measurement conditions described in Example 1.

As a result, the following values were obtained as the theoretical plate number for each peak. In the parentheses, a ratio to the value of benzene taken as 1 is shown. Benzene: 8,210 (1.00), naphthalene: 5,360 (0.65), anthracene: 3,850 (0.47) and pyrene: 2,950 (0.36).

Comparative Example 4

Using commercially available polymer-type Reversed Phase Column-B (using a packing agent having an average particle size of 5 μm, which is obtained by homo-polymerizing ethylene glycol dimethacrylate; 4.6 mm (inside diameter)×150 mm (length)), the theoretical plate number was measured for the peaks of benzene and polycyclic aromatic compounds under the measurement conditions described in Example 1.

As a result, the following values were obtained as the theoretical plate number for each peak. In the parentheses, a ratio to the value of benzene taken as 1 is shown. Benzene: 8,900 (1.00), naphthalene: 7,030 (0.79), anthracene: 6,770 (0.76) and pyrene: 4,500 (0.51).

Comparative Example 5

Using commercially available ODS Column C (using a packing agent having an average particle size of 4 μm, in which an octadecyl group is introduced into silica gel; 4.6 mm (inside diameter)×150 mm (length)), the theoretical plate number was measured for the peaks of benzene and polycyclic aromatic compounds under the same measurement conditions as in Example 1.

As a result, the following values were obtained as the theoretical plate number for each peak. In the parentheses, a ratio to the value of benzene taken as 1 is shown. Benzene: 16,000 (1.00), naphthalene: 13,800 (0.86), anthracene: 13,300 (0.83) and pyrene: 12,600 (0.79).

Comparative Example 6

Using commercially available ODS Column B (using a packing agent having an average particle size of 5 μm, in which an octadecyl group is introduced into silica gel; 4.6 mm (inside diameter)×150 mm (length)), the theoretical plate number was measured for the peaks of benzene and polycyclic aromatic compounds under the same measurement conditions as in Example 1.

As a result, the following values were obtained as the theoretical plate number for each peak. In the parentheses, a ratio to the value of benzene taken as 1 is shown. Benzene: 12,700 (1.00), naphthalene: 11,800 (0.93), anthracene: 9,900 (0.78) and pyrene: 8,700 (0.69).

According to the production process of a packing agent for reversed phase liquid chromatography of the present invention, a high-performance packing agent for reversed phase liquid chromatography can be produced. The column for reversed phase liquid chromatography obtained by filling the packing agent for reversed phase liquid chromatography of the present invention has high separation capability. Therefore, when the column is used in the analysis method by reversed phase liquid chromatography of the present invention, high-precision separation/analysis can be attained particularly for medical/agricultural chemicals, food additives and their intermediates, for natural or synthetic polymers and their additives and for environmental pollutants. Thus, the present invention is useful in the field over a wide range.

While the invention has been described in detail and with reference to specific embodiments thereof, it will be apparent to one skilled in the art that various changes and modifications can be made therein without departing from the spirit and scope thereof.

What is claimed is:

1. A process for producing a packing agent for reversed liquid chromatography, comprising
   polymerizing in an aqueous suspension a crosslinkable vinyl ester or vinyl ether containing a hydroxyl group to obtain crosslinked polymer particles,
   classifying the obtained crosslinked polymer particles into crosslinked polymer base particles having an exclusion limit molecular weight of 100,000 or less in terms of standard polystyrene by size exclusion chromatography, and
   ester-bonding an acyl group having from 4 to 24 carbon atoms to a part of hydroxyl groups in the crosslinked polymer base particles.

2. The production process of a packing agent for reversed phase liquid chromatography as claimed in claim 1, wherein at least one hydrophilic solvent selected from the group consisting of alcohols having from 5 to 12 carbon atoms is used as a diluent for aqueous suspension polymerization.

3. The production process of a packing agent for reversed phase liquid chromatography as claimed in claim 2, wherein the diluent is added in an amount of 10 to 300% by mass based on a total amount of monomers.

4. The production process of a packing agent for reversed phase liquid chromatography as claimed in any one of claims 1 to 3, wherein the acyl group is introduced in an amount of 1 to 30 mol % based on all hydroxyl groups in the crosslinked polymer base particles.

5. The production process of a packing agent for reversed phase liquid chromatography as claimed in any one of claims 1 to 3, wherein the acyl group introduced is a group selected from the group consisting of a tetracosanoyl group, a docosanoyl group, an eicosanoyl group, an octadecanoyl group, a hexadecanoyl group, a tetradecanoyl group, a dodecanoyl group, a decanoyl group, an octanoyl group, a 2-ethylhexanoyl group, a hexanoyl group and a butanoyl group.

6. The production process of a packing agent for reversed phase liquid chromatography as claimed in any one of claims 1 to 3, wherein a free carboxyl group in the crosslinked polymer base particles is capped by an inactive group.

7. The production process of a packing agent for reversed phase liquid chromatography as claimed in any one of claims 1 to 3, further comprising washing the crosslinked polymer base particles with a polar organic solvent and drying immediately before introducing an acyl group.

* * * * *